Patented Apr. 22, 1952

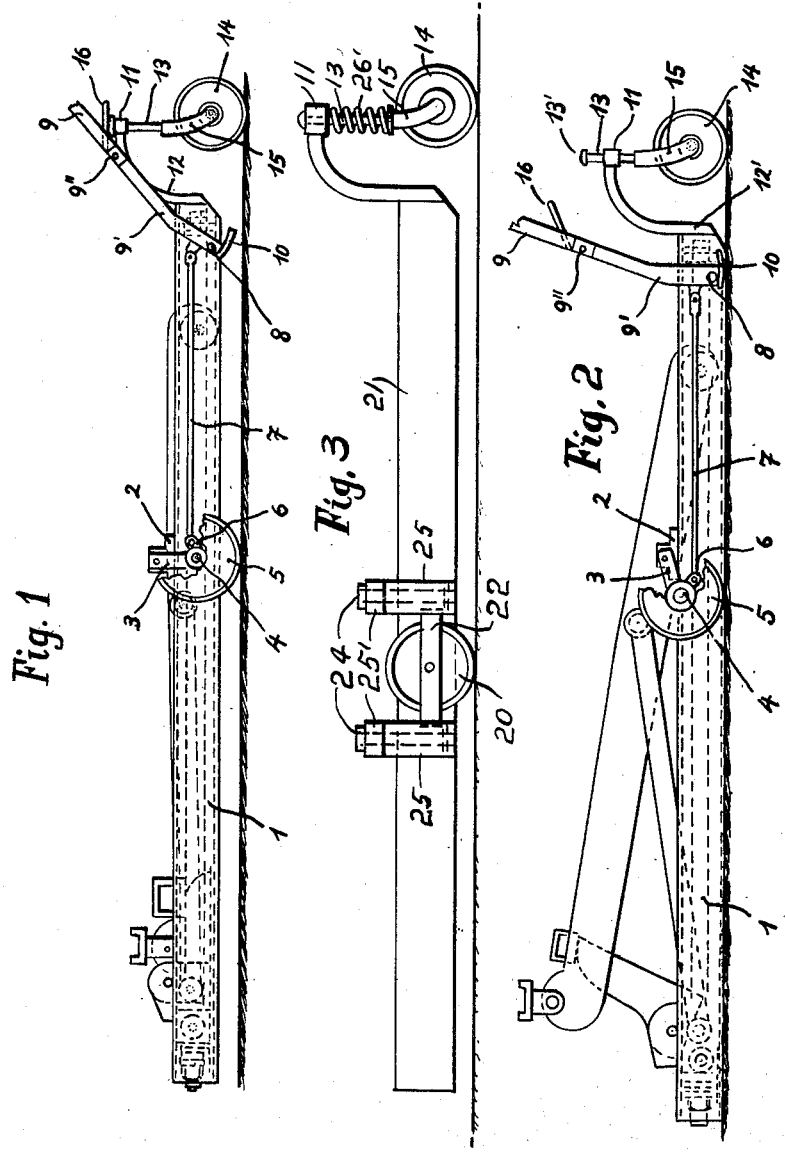

2,594,270

UNITED STATES PATENT OFFICE 2,594,270

LIFTING JACK

Alfred Niederhauser, Basel, Switzerland

Application August 6, 1947, Serial No. 766,812
In Switzerland October 21, 1944

5 Claims. (Cl. 254—1)

The invention relates to an improvement in or for lifting jacks with frames transportable on truck wheels, which are intended for lifting loads, particularly automobiles and other vehicles.

In known lifting jacks of this kind, their transportable frame remains supported on the truck wheels, even when lifting loads. This is a great drawback, especially when lifting heavy loads, since the axles of the wheels are subjected to large radial pressures and, since the parts of the ground on which the truck wheels rest are almost always different in hardness, the wheels are pressed different depths into the ground, in consequence of which there is a risk of sliding or of tipping of the load being lifted.

This drawback is eliminated in the lifting jack according to this invention, since it can be supported on the ground over the whole undersurface of the frame when loads are being raised.

The invention is explained with reference to the accompanying drawing which illustrates two examples of execution.

Fig. 1 is a side view of a lifting jack ready for transport, whose truck wheels can be set high by levers, and Fig. 2 a side view of the same jack in its position ready for service.

Fig. 3 shows a side view of an unloaded jack in which the truck wheels, according to the second example of execution, are set high by means of compression springs.

Figure 4:
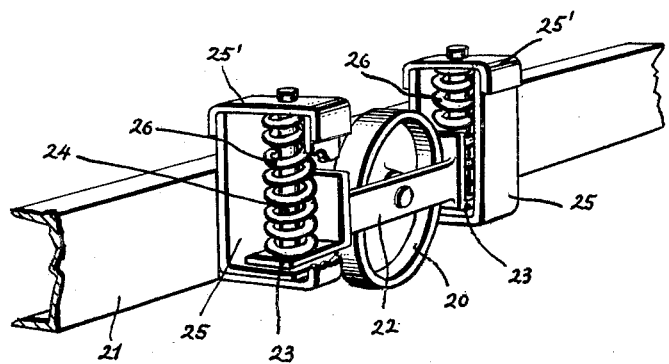
Fig. 4 shows details of the spring mounting of Fig. 3, and Fig. 5 the same with the jack loaded.
Figure 5:
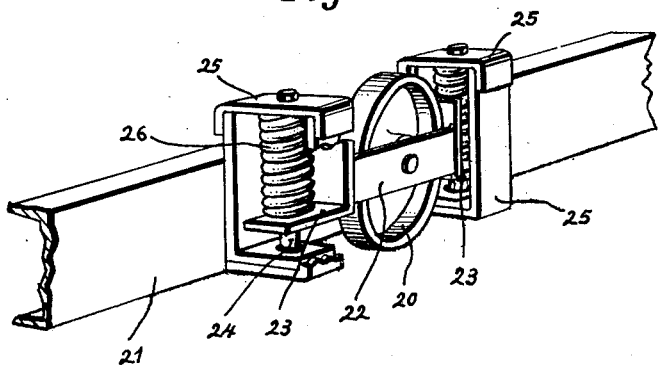

In the first example of execution according to Figs. 1 and 2 the lifting jack comprises a frame having two side beams 1 joined together at their ends to form a support for the lifting mechanism illustrated which is fully described and claimed in my copending application Serial No. 766,811, filed August 6, 1947, now Patent No. 2,458,407, dated January 4, 1949. A block 2 is fixed on the upper side of each of the two side-frame beams 1 intermediate the ends thereof. On the beam 2 a rocking lever 3 is pivoted, which has at its lower end an axle 4 for the truck wheel 5, and it is provided with a projection 6 directed towards the front. At the front part of the beams 1 are pivots 8 on which a yoke or stirrup 9 is mounted by arms 9' which are directed downwards. A connecting rod 7 is pivoted at its respective ends to the projection 6 and the arm 9'. For supporting the arm 9' on the ground in order to assist in raising the frame up into the transporting position shown in Fig. 1 as the stirrup is moved clockwise from the position shown in Fig. 2, the arm is provided with a foot 10. This foot 10 may advantageously—not to be seen from the drawing—be turned high up after the frame 1 has been raised on to the truck wheels, in order that the foot may not touch the ground during transport. A vertical sleeve 11 is provided in a support 12 on the front part of the frame in which the vertical pivot bolt 13 of a castor 15 carrying the front wheel 14 intended for guiding is supported adjustable in height. To the point of connection 9'' of the two arms 9' bridging over the front part of the lifting jack frame, a bridge-piece or pressure plate 16 directed forwards is fixed which can be pressed onto the head 13' of the pivot bolt by swinging the stirrup 9 clockwise as seen in Figs. 1 and 2. By this means, when the castor 15 with the castor wheel 14 is pressed to the ground, a lifting force is exerted on the front of the frame and at the same time a pull is exerted to the front through the bars 7 on the rocking levers 3, thus causing the lifting jack to be raised on to the two side wheels 5 and the front wheel 14. Means (not shown) are preferably provided to latch the stirrup 9 on the support 12 in this position ready for transport. With the jack in position ready for service, the latch is loosened to permit the yoke or stirrup 9 to be swung counterclockwise, whereby the two side wheels 5 are caused to be pushed back and the jack descends so that its whole undersurface comes to rest on the ground and thus forms a secure foundation for lifting very heavy loads.

In the second example of execution illustrated in Figs. 3 and 4, the axles of the wheels 20 on the sides of the jack are held in a bearing strap 22 which passes around the wheels and is provided at each end with a plate 23. These plates 23 are each guided with a suitable bore on a vertical pin 24. Each of the pins 24 is fixed in a U-shaped support 25 welded on the side-frame beam 21, this support being covered above by a cap plate 25' bolted down with the pin 24. Between the cap plate 25' and the plate 23 a coiled compression spring 26 is arranged on each of the pins 24. To give a springing support of the frame 1 on the guide wheel 14 (as in Fig. 1), a compression spring 26' is simply arranged on the pivot bolt 13 between the sleeve 11 and the castor 15. The total force of the springs used for the adjustable supporting of the wheels 20 is so chosen that it keeps the jack supported on the wheels when in the unloaded state. The result of this is that, when using the lifting jack, the load to be raised presses the frame onto the ground against the action of the springs, where the frame comes to lie with its whole undersurface as a secure base for carrying big loads.

When load is removed from the jack, the frame is raised up by the springs, so that it is at once automatically ready for transport immediately after use. This method of supporting according to the invention gives in addition an advantageous springing of the lifting-jack frame while being transported.

What I claim and desire to protect by Letters Patent is:

1. A lifting jack comprising a frame adapted to rest over its whole undersurface on a flat support, a pair of side wheels, a carriage for each of said wheels having an axle on which the wheel is rotatably mounted, a pair of vertical pins secured to each side of said frame, said carriages being slidably mounted on said pins, a castor wheel mounted for vertical movement in a sleeve supported at one end of the frame, and springs pressing said castor and carriages downwardly, the total force of said springs being sufficient to support the weight of the unloaded jack.

2. A lifting jack comprising a frame having side and end members adapted to rest over its whole undersurface on a flat support, a pair of spaced brackets secured to each side member, a vertical pin in each bracket, a wheel carriage mounted for vertical movement on the pins in each pair of brackets, a wheel mounted on said carriage, and means for moving said carriage downwardly on said pins to lift said frame.

3. A lifting jack as set forth in claim 2 in which said means comprises springs.

4. A lifting jack as set forth in claim 2 in which a vertically movable castor wheel is provided on one of said end members, and means for moving said castor wheel downwardly.

5. A lifting jack as set forth in claim 4 in which said means for moving said carriages and castor wheel downwardly comprises springs.

ALFRED NIEDERHAUSER.

REFERENCES CITED

The following references are of record in the file of this patent:

UNITED STATES PATENTS

| Number | Name | Date |
| --- | --- | --- |
| 1,248,929 | Schubert | Dec. 4, 1917 |
| 1,355,173 | Shadel | Oct. 12, 1920 |
| 1,415,857 | Avery | May 16, 1922 |
| 1,477,790 | Townsend | Dec. 18, 1923 |
| 2,456,218 | Semisch | Dec. 14, 1948 |

FOREIGN PATENTS

| Number | Country | Date |
| --- | --- | --- |
| 721,639 | France | Dec. 22, 1931 |
| 732,000 | France | June 6, 1932 |